(12) United States Patent
Murai (10) Patent No.: US 12,496,990 B2
(45) Date of Patent: Dec. 16, 2025

(54) CONTROLLER FOR DEFOGGER (71) Applicant: TOYOTA JIDOSHA KABUSHIKI KAISHA, Toyota (JP)

(72) Inventor: Gota Murai, Anjo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 61 days.

(21) Appl. No.: 18/635,769

(22) Filed: Apr. 15, 2024

(65) Prior Publication Data

US 2024/0351535 A1    Oct. 24, 2024

(30) Foreign Application Priority Data

Apr. 24, 2023 (JP) ................................ 2023-070865

(51) Int. Cl.
*B60R 16/023* (2006.01)
*H05B 1/02* (2006.01)
*H05B 3/86* (2006.01)

(52) U.S. Cl.
CPC ....... *B60R 16/0237* (2013.01); *H05B 1/0236* (2013.01); *H05B 3/86* (2013.01)

(58) Field of Classification Search
CPC ...... B60R 16/0237; H05B 1/0236; H05B 3/86
USPC ......................................................... 701/36
See application file for complete search history.

(56) References Cited

U.S. PATENT DOCUMENTS

| | | | | |
|---|---|---|---|---|
| 4,894,514 A | * | 1/1990 | Delvin | B32B 17/10174 219/203 |
| 5,496,989 A | * | 3/1996 | Bradford | B60S 1/026 219/494 |
| 8,084,716 B2 | * | 12/2011 | Day | H05B 1/0236 219/203 |
| 8,725,349 B2 | | 5/2014 | Horbatt | |
| 12,129,013 B2 | * | 10/2024 | Borges | H05B 3/86 |
| 2008/0191550 A1 | * | 8/2008 | Parnis | H01R 13/68 307/9.1 |
| 2018/0034259 A1 | | 2/2018 | Sugisawa | |
| 2019/0373681 A1 | * | 12/2019 | Saad | H05B 1/0236 |

FOREIGN PATENT DOCUMENTS

| | | | | |
|---|---|---|---|---|
| EP | 3070995 A1 | * | 9/2016 | ........... H05B 1/0236 |
| JP | 2016-163403 A | | 9/2016 | |
| KR | 20010008498 A | * | 2/2001 | ............... H05B 3/84 |

OTHER PUBLICATIONS

Ediz, Fatih. "Investigation of Windshield Defogging and Defrosting Designs to Decrease Energy Consumption in Vehicles", Izmir Institute of Technology, Dec. 5, 2023, https://openaccess.iyte.edu.tr/bitstream/11147/2700/1/2700.pdf. (Year: 2023).*

* cited by examiner

*Primary Examiner* — Matthias S Weisfeld
*Assistant Examiner* — Hyang Ahn
(74) *Attorney, Agent, or Firm* — Oblon, McClelland, Maier & Neustadt, L.L.P.

(57) ABSTRACT

A controller for a defogger including a heating wire disposed on a window glass of a vehicle turns on the defogger. The controller repeatedly acquires a value of current flowing through the heating wire while the defogger is on. The controller turns off the defogger based on the value of the current having converged to a constant value.

3 Claims, 5 Drawing Sheets

CONTROLLER FOR DEFOGGER

RELATED APPLICATION

The present application claims priority of Japanese Patent Application No. 2023-070865 filed on Apr. 24, 2023, the disclosure of which is hereby incorporated by reference herein in its entirety.

BACKGROUND

1. Field

The present disclosure relates to a controller for a defogger.

2. Description of Related Art

Defoggers include a heating wire disposed on a window glass of a vehicle. By energizing the heating wire, the window glass can be heated, thereby removing fog or the like formed on the window glass.

Typically, defoggers are turned on by a user pressing a switch. After a certain period has elapsed from when the defogger was turned on, the defogger turns off.

Japanese Laid-Open Patent Publication No. 2016-163403 discloses an interrupting device that interrupts current supplied to a load via an electric wire based on a predetermined condition. The interrupting device periodically calculates the temperature of the electric wire based on the value of the current flowing through the electric wire. When the calculated temperature of the electric wire is greater than or equal to a threshold temperature, the interrupting device interrupts the current flowing through the electric wire. The threshold temperature is set in advance so as to prevent smoking or ignition from the electric wire.

The power consumption that occurs during the operation of the defogger is relatively large. To reduce the power consumption, minimizing the operation time of the defogger is desirable.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

An aspect of the present disclosure provides a controller for a defogger including a heating wire disposed on a window glass of a vehicle. The controller includes processing circuitry configured to turn on the defogger, repeatedly acquire a value of current flowing through the heating wire while the defogger is on, and turn off the defogger based on the value of the current having converged to a constant value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a defogger controller according to an embodiment will be described with reference to the drawings.

Schematic Configuration

Figure 1:
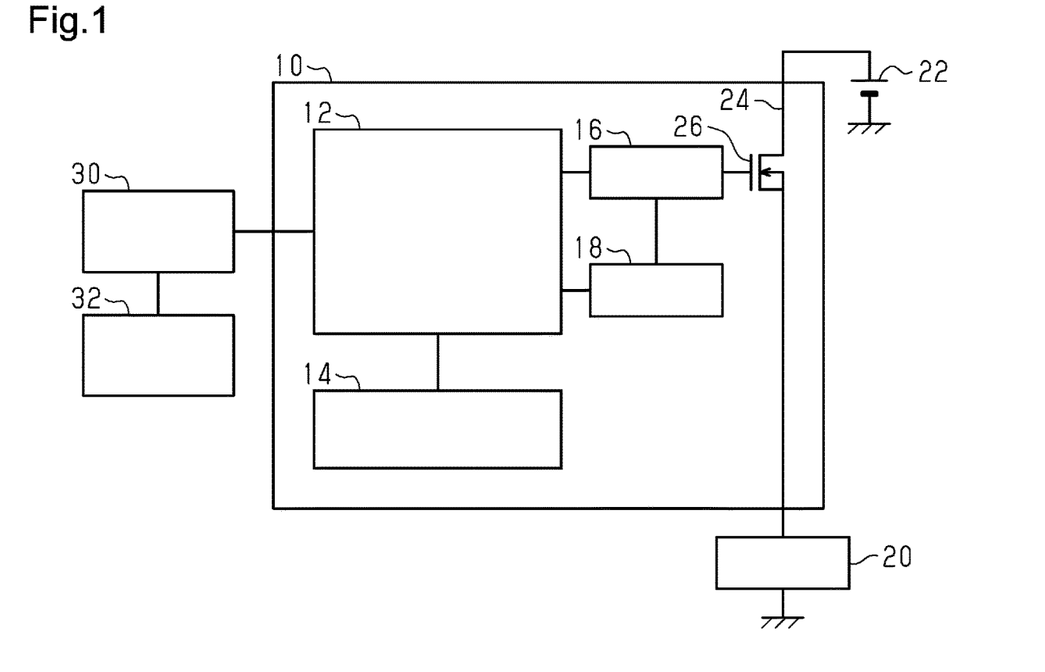
FIG. 1 is a diagram showing a controller for a defogger according to an embodiment.

A controller 10 for a defogger 20 will now be described with reference to FIG. 1. The defogger 20 includes a heating wire disposed on a window glass of a vehicle. The defogger 20 is, for example, a rear defogger having a heating wire provided on a rear window glass. The controller 10 keeps the defogger 20 ON while repeatedly receiving an ON signal from an air-conditioning ECU 30 that controls the air-conditioning device. The air-conditioning ECU 30 starts transmission of the ON signal when the user presses a button 32 connected to the air-conditioning ECU 30. The controller 10 controls turning on and off of the defogger 20 by turning on and off a circuit switch 26 provided in an electric wire 24 connecting the power supply 22 and the defogger 20. The circuit switch 26 is a field-effect transistor (FET). The circuit switch 26 and the current detector 18 (described later) constitute a relay. As will be described later, when affirmative determinations are made in both step S310 and step S312 in FIG. 3, the controller 10 requests the air-conditioning ECU 30 to stop the ON signal. That is, the controller 10 turns off the defogger 20.

The controller 10 includes a control unit 12, a storage device 14, a drive circuit 16, and a current detector 18. The control unit 12 includes a CPU and a RAM. The storage device 14 is, for example, a ROM. The ROM stores programs and data for control. The CPU executes a program stored in the ROM. The RAM is a work area when the CPU executes a program. The control unit 12 controls the drive circuit 16. The drive circuit 16 turns on and off the circuit switch 26 by adjusting the voltage applied to the gate of the circuit switch 26. The drive circuit 16 is connected to the current detector 18. The current detector 18 is connected to the control unit 12. The current detector 18 detects a current flowing through the electric wire 24. Next, the current detector 18 outputs current information indicating the value of the detected current to the drive circuit 16 and the control unit 12. Thus, while the defogger 20 is on, the controller 10 repeatedly acquires the value of the current flowing through the heating wire.

Changes in Value of Current During Operation of Defogger 20

Figure 2:
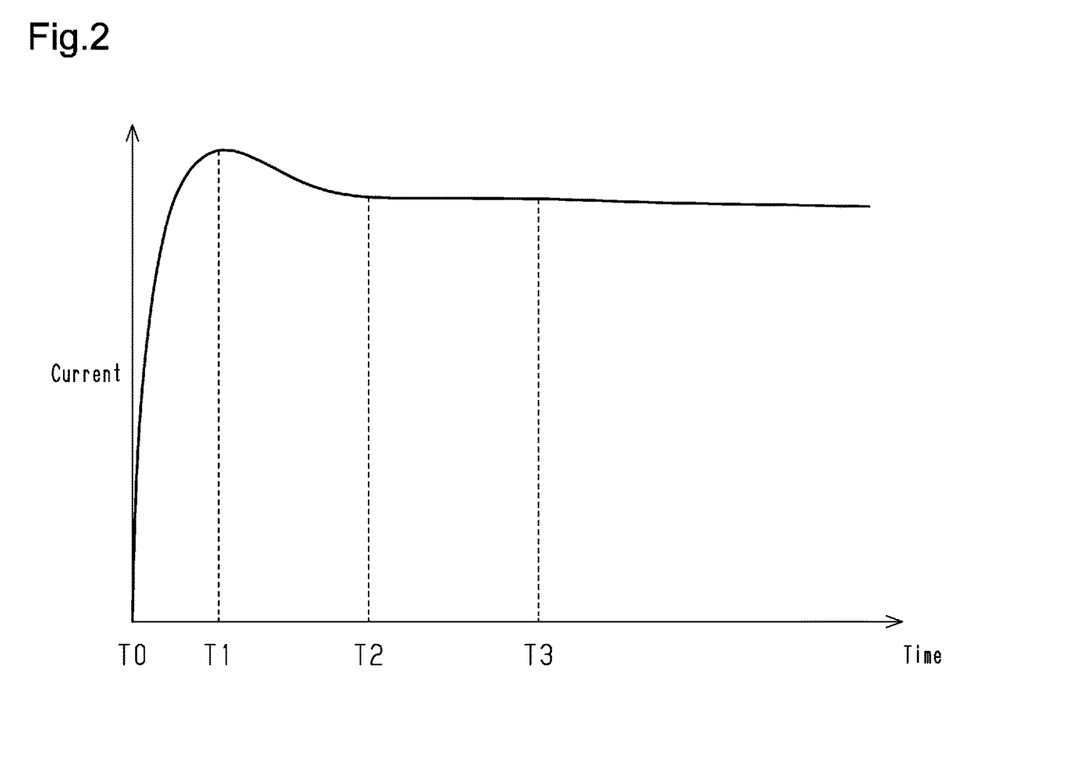
FIG. 2 is a schematic diagram illustrating changes in the value of current during the operation of the defogger.

Referring to FIG. 2, a change in the value of the current during the operation of the defogger 20 will be described. At time T0, the defogger 20 is turned on. From time T0 to time T1, the current flowing through the heating wire increases. At time T1, the current reaches a maximum value. Time T0 to time T1 is about several seconds.

Generally, the resistance of a conductor increases as the temperature of the conductor increases. Therefore, after time T1, the value of the current gradually decreases.

When the heating wire is sufficiently warmed, the temperature of the heating wire stabilizes at a substantially constant value. This means that the magnitude of the resistance of the heating wire stabilizes at a substantially constant value. Therefore, the value of the current flowing through the heating wire also stabilizes at a substantially constant value. After time T2, the value of the current also stabilizes at a substantially constant value. In particular, the current values are substantially the same at time T2 and time T3. Time T0 to time T2 is about several minutes.

When the value of the current stabilizes at a substantially constant value, there is a high possibility that the heating wire is sufficiently heated and the fog or the like generated on the window glass is sufficiently removed. The inventor of the present invention focused on this point and designed the controller 10. Next, processing executed by the controller 10 will be described.

Processes Executed by Controller 10

Figure 3:
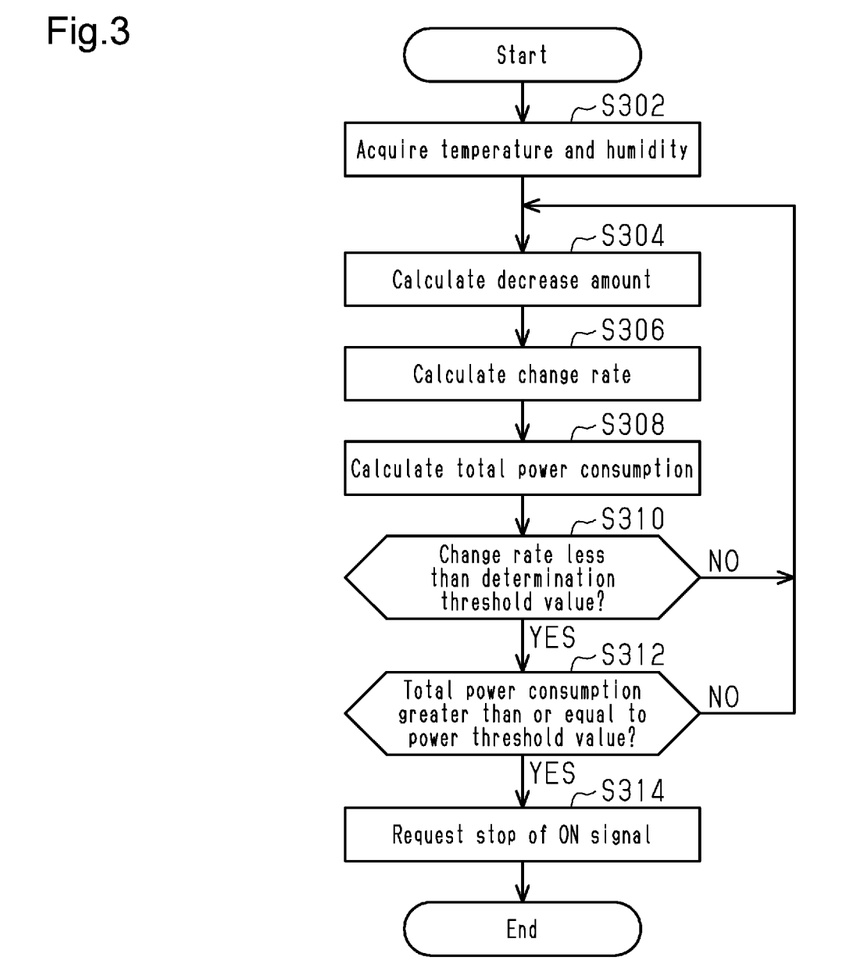
FIG. 3 is a flowchart illustrating the processes executed by the controller shown in FIG. 1.

A process executed by the controller 10 will be described with reference to FIGS. 3 and 4. The controller 10 starts the processing shown in FIG. 3 when the user presses the button 32. As will be described later, the controller 10 starts the process shown in FIG. 4 immediately after the end of the process shown in FIG. 3. In the processing shown in FIG. 4, the controller 10 monitors whether the user has pressed the button 32 again. As described above, the air-conditioning ECU 30 starts transmitting the ON signal based on the user pressing the button 32 connected to the air-conditioning ECU 30. The controller 10 keeps the defogger 20 ON while repeatedly receiving the ON signal.

In step S302, the controller 10 acquires the temperature and humidity outside the vehicle at the point in time when the defogger 20 is turned on. The controller 10 may acquire the temperature and humidity of the outside the car from an air-conditioning ECU 30.

In step S304, the controller 10 calculates a decrease amount. The decrease amount is an amount by which the acquired value of the current has decreased from the value of the current acquired before a predetermined period. The decrease amount is a positive value. While the value of the current is increasing, the decrease amount is not calculated because the value of the current is not decreasing. As the predetermined period, for example, a period shorter than the period from time T0 to time T2 is appropriately set.

In step S306, the controller 10 calculates a change rate. The change rate is a value obtained by dividing the decrease amount by the value of the current acquired before the predetermined period elapses. When the decrease amount is not calculated, the controller 10 sets the change rate to a default value that is larger than a determination threshold value, which will be described later.

In step S308, the controller 10 repeatedly calculates a total power consumption. The total power consumption is the total of power consumed by the defogger 20 from when the defogger 20 is turned on.

In step S310, the controller 10 determines whether the change rate is less than the determination threshold value. The determination threshold value is appropriately set to a positive value close to 0 so that it can be determined that the value of the current has converged to a constant value. Thus, the controller 10 determines that the value of the current has converged to the constant value when the change rate is less than the determination threshold value. If a negative determination is made in step S310 (S310: NO), the controller 10 returns to step S304. If a positive determination is made in step S310 (S310: YES), the controller 10 proceeds to step S312.

In step S312, the controller 10 determines whether the total power consumption is greater than or equal to the power threshold value. The power threshold value is set so as to avoid a situation where the defogger 20 is turned off even though the total power consumption is too small. Here, when the total power consumption is too small, it means that there is a high possibility that fog or the like generated on the window glass is not sufficiently removed. If a negative determination is made in step S312 (S312: NO), the controller 10 returns to step S304. If a positive determination is made in step S312 (S312: YES), the controller 10 proceeds to step S314.

In step S314, the controller 10 requests the air-conditioning ECU 30 to stop transmission of the ON signal. That is, the controller 10 turns off the defogger 20. In step S310 to step S314, the controller 10 turns off the defogger 20 when the total power consumption is greater than or equal to the power threshold value and the value of the current has converged to the constant value.

Figure 4:
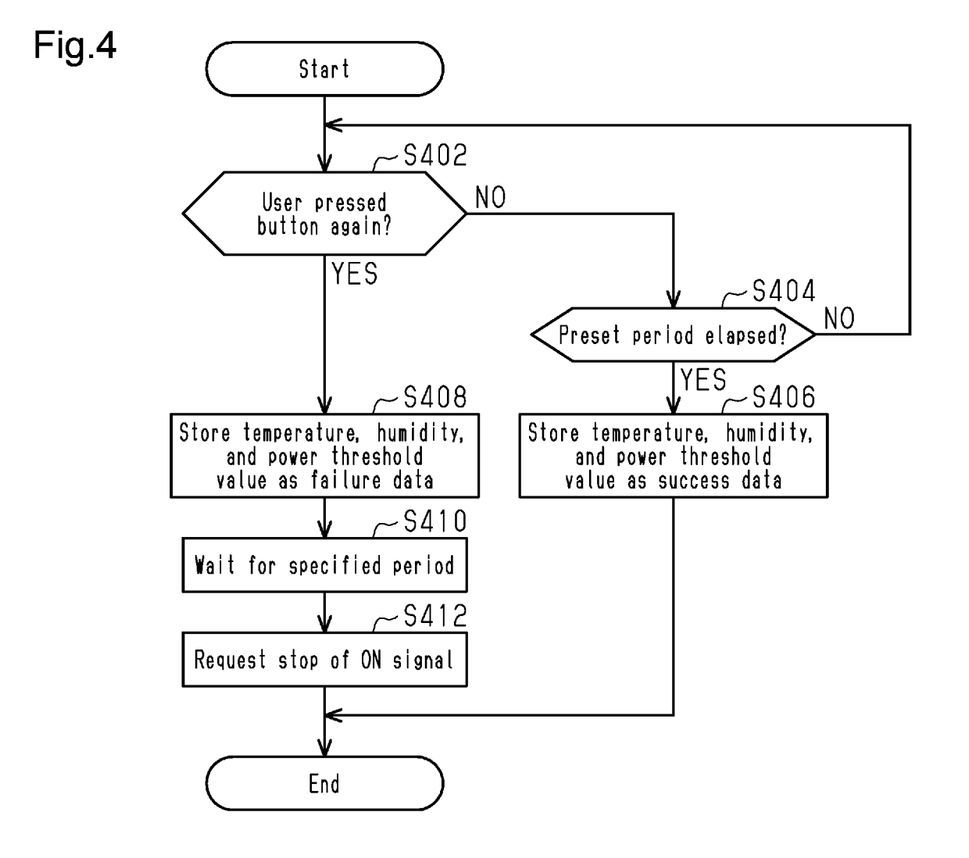
FIG. 4 is a flowchart illustrating the processes executed by the controller shown in FIG. 1.

Immediately after the defogger 20 is turned off FIG. 4 immediately after the defogger 20 is turned off in step S314. In step S402, the controller 10 determines whether the user has pressed the button 32 again. For example, the controller 10 determines that the user has pressed the button 32 again based on the reception of the ON signal from the air-conditioning ECU 30. If a negative determination is made in step S402 (S402: NO), the controller 10 proceeds to step S404. In Step S404, the controller 10 determines whether a preset period has elapsed from when the defogger 20 was turned off based on the value of the current having converged to the constant value. For example, in a case where the user presses the button 32 again immediately after the defogger 20 is turned off, there is a high possibility that the removal of fog or the like generated on the window glass is insufficient. This means, for example, that the value of the power threshold value may have been smaller than a suitable value. The preset period is set so that the validity of the process shown in FIG. 3 can be determined. For example, the preset period is set to a length less than one minute. If a negative determination is made in step S404 (S404: NO), the controller 10 returns to step S402. In step S402 and step S404, the controller 10 determines whether the defogger 20 has been turned on again within the preset period from when the defogger 20 was turned off based on the value of the current having converged to the constant value.

If a positive determination is made in step S404 (S404: YES), the controller 10 proceeds to step S406. In step S406, the controller 10 stores the power threshold value and the temperature and humidity acquired in step S302 in the storage device 14 as success data.

If a positive determination is made in step S402 (S402: YES), the controller 10 proceeds to step S408. When the controller 10 makes a positive determination in step S402, it means that the controller 10 has received the ON signal before the elapse of the preset period, which has been described above. Next, in step S408, the controller 10 stores the power thresholds and the temperatures and humidity acquired in step S302 in the storage device 14 as failure data. According to step S402, step S404, and step S408, when the defogger 20 has been turned on again within the preset period, the controller 10 stores the temperature, the humidity, and the power threshold value in the storage device 14 as failure data.

After executing the process of step S408, the controller 10 proceeds to step S410. In Step S410, the controller 10 waits for a specified period. The specified period is a value sufficient to remove the fog or the like that cannot be removed through the processing described with reference to FIG. 3. For example, the specified period is several minutes. The controller 10 waits for the specified period in step S410, and then proceeds to step S412. In step S412, the controller 10 requests the air-conditioning ECU 30 to stop transmission of the ON signal. That is, the controller 10 turns off the defogger 20.

Signal Exchange Between Controller 10 and Air-Conditioning ECU 30

Figure 5:
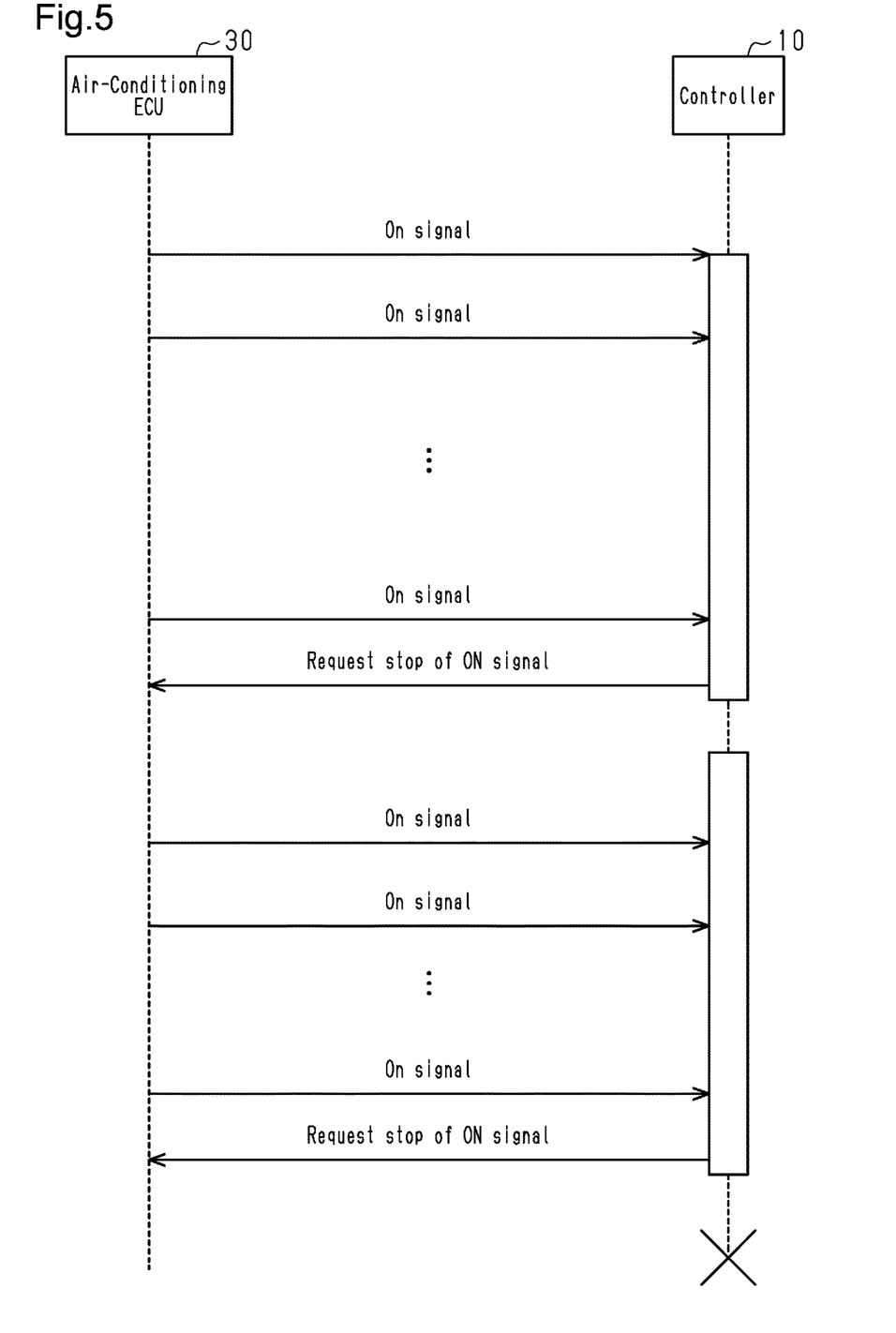
FIG. 5 is a sequence diagram illustrating exchange of the signal between the controller and the air-conditioning ECU shown in FIG. 1.

With reference to FIG. 5, the relationship between the exchange of signals between the controller 10 and the air-conditioning ECU 30, the processing shown in FIG. 3, and the processing shown in FIG. 4 will be described. Two rectangles shown in FIG. 5 indicate the processing shown in FIG. 3 and the processing shown in FIG. 4, respectively.

When the user presses the button 32, the air-conditioning ECU 30 starts transmitting the ON signal to the controller 10. As a result, the controller 10 starts the in FIG. 3. The air-conditioning ECU 30 continues to repeatedly transmit the ON signal until the stop of the ON signal is requested from the controller 10. While repeatedly receiving the ON signal, the controller 10 continues the processing shown in FIG. 3 to continue the energization of the defogger 20. In step S314 of FIG. 3, the controller 10 requests the air-conditioning ECU 30 to stop the ON signal. As a result, the transmission of the ON signal from the air-conditioning ECU 30 is stopped, and the controller 10 turns off the defogger 20. Next, the controller 10 starts the processing shown in FIG. 4.

FIG. 5 illustrates a case where the defogger 20 is turned on again by the user pressing the button 32 within the above-described preset period. When the user presses the button 32, the air-conditioning ECU 30 starts transmitting an ON signal to the controller 10. The controller 10 turns on the defogger 20 on the basis of receiving an ON signal from the air-conditioning ECU 30 within the preset period. In step S408 of FIG. 4, the controller 10 stores the temperature, the humidity, and the power threshold value in the storage device 14 as failure data. The controller 10 waits for the specified period in step S410 of FIG. 4. Next, in step S412, the controller 10 requests the air-conditioning ECU 30 to stop the ON signal. As a result, the transmission of the ON signal from the air-conditioning ECU 30 is stopped, and the controller 10 turns off the defogger 20.

When the controller 10 does not receive the ON signal from the air-conditioning ECU 30 within the preset period, the controller 10 stores the power threshold value, the temperature, and the humidity in the storage device 14 as success data in step S406. In this case, since the ON signal is not received from the air-conditioning ECU 30, the controller 10 does not turn on the defogger 20.

Operation and Advantages of Present Embodiment (1) The controller 10 for the defogger 20, which includes the heating wire disposed on the window glass of the vehicle, is configured to turn on the defogger 20, repeatedly acquire the value of the current flowing through the heating wire while the defogger 20 is on, and turn off the defogger 20 based on the value of the current having converged to the constant value.

The energization of the heating wire in the defogger 20 increases the temperature of the heating wire. Generally, as the temperature of a conductor increases, the resistance of the conductor increases. Thus, when the defogger 20 is turned on, the current flowing through the heating wire rises to a maximum value. Subsequently, the current gradually decreases. When the heating wire is sufficiently warmed, the temperature of the heating wire stabilizes at a substantially constant value. This indicates that the magnitude of the resistance of the heating wire stabilizes at a substantially constant value. Thus, the value of the current flowing through the heating wire also stabilizes at a substantially constant value. Accordingly, when the value of the current also stabilizes at a substantially constant value, there is a high possibility that the heating wire is sufficiently heated and the fog or the like formed on the window glass is sufficiently removed. The controller 10 turns off the defogger 20 in a case in which the value of the current has converged to the constant value. This easily avoids situations in which the defogger 20 is unnecessarily operated even though there is a high possibility that the fog or the like formed on the window glass is sufficiently removed.

(2) The controller 10 is configured to calculate the decrease amount, which is an amount by which the value of the acquired current has decreased from the value of the current acquired before the predetermined period, calculate the change rate, which is a value obtained by dividing the decrease amount by the value of the current acquired before the predetermined period elapses, and determine that the value of the current has converged to the constant value when the change rate is less than the determination threshold value.

When the change rate is less than the determination threshold value, it indicates that the decrease in the current has converged. Therefore, according to the controller 10 described above, it can be determined that the value of the current during energization has converged to a constant value based on the fact that the change rate is less than the determination threshold value.

(3) The controller 10 is configured to repeatedly calculate the total power consumption while the defogger 20 is on. The total power consumption is the total of the power consumed by the defogger 20 from when the defogger 20 is turned on. The controller 10 is further configured to turn off the defogger 20 when the total power consumption is greater than or equal to the power threshold value and the value of the current has converged to the constant value.

As the total power consumption increases, fog or the like generated on the window glass decreases. The controller 10 determines whether to turn off the defogger 20 based on both the total power consumption and the change rate. That is, it is possible to avoid a situation where the defogger 20 is turned off even though the total power consumption is too small. Here, when the total power consumption is too small, it means that there is a high possibility that fog or the like generated on the window glass is not sufficiently removed. Therefore, the determination accuracy can be improved.

(4) The controller 10 further includes the storage device 14. The controller 10 is configured to acquire the temperature and humidity outside the vehicle at the point in time when the defogger 20 is turned on, determine whether the defogger 20 has been turned on again within the preset period from when the defogger 20 was turned off based on the value of the current having converged to the constant value, and store the temperature, the humidity, and the power threshold value as failure data in the storage device 14 when the defogger 20 has been turned on again within the preset period.

When the defogger 20 has been turned on again within the preset period, it means that the defogger 20 has been turned off before the fog or the like generated on the window glass is sufficiently removed. The controller 10 can accumulate data acquired in such a situation. The data accumulated in this way can be utilized when designing the controller 10 that adjusts the operation period of the defogger 20 based on the temperature and humidity outside the vehicle.

Modifications

The present embodiment may be modified as follows. The present embodiment and the following modifications can be combined as long as they remain technically consistent with each other.

In the above-described embodiment, the circuit switch 26 and the current detector 18 constitute a relay. The relay may be a mechanical relay or a semiconductor relay. The mechanical relay does not have a current value detection function, whereas the semiconductor relay originally has a current value detection function. By adopting the semiconductor relay, there is no need to provide a circuit for detecting a current value separately from the relay. This is advantageous in terms of cost.

In the above-described embodiment, the controller 10 calculates the change rate, which is a value obtained by dividing the decrease amount by the value of the current acquired before the predetermined period elapses. However, this is merely exemplary. For example, the change rate may be a value obtained by dividing the decrease amount by a predetermined period.

Figure 6:
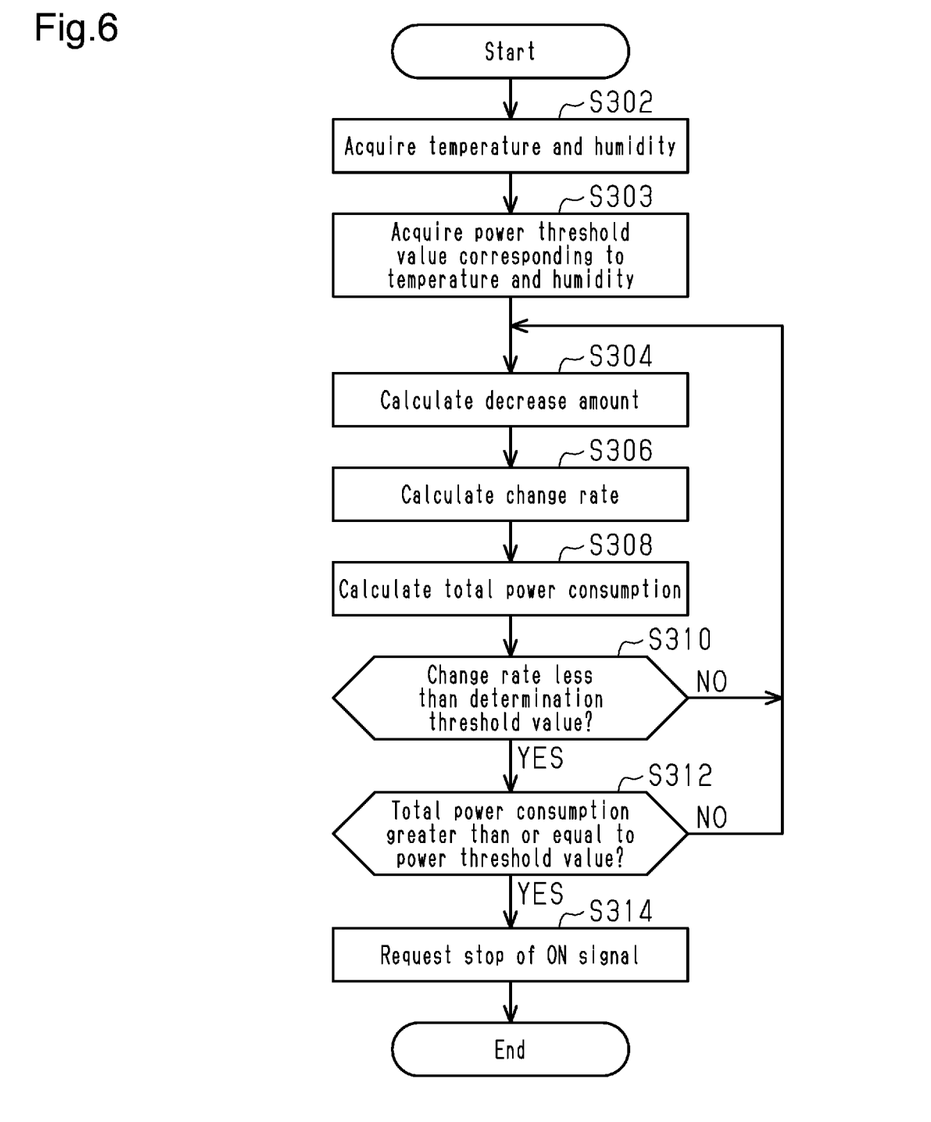
FIG. 6 is a flowchart illustrating the processes according to a modification.

A controller 10 for a defogger 20 according to a modification will now be described with reference to FIG. 6. The storage device 14 of the controller stores a map that defines the relationship of the power threshold value with the temperature and the humidity outside the vehicle at the point in time when the defogger 20 is turned on. In step S302, the controller 10 acquires the temperature and the humidity outside the vehicle at the point in time when the defogger 20 is turned on. In step S303, the controller 10 acquires, from the map, the power threshold value corresponding to the acquired temperature and humidity. According to the configuration of FIG. 6, the power threshold value is variably set based on the temperature and humidity outside the vehicle. Therefore, it is possible to improve the determination accuracy in determining whether to turn off the defogger 20. The stored data described with reference to FIG. 4 is useful for redesigning the map. For example, when the defogger 20 is turned on again after being turned off based on the current threshold value, the current threshold value in the map is updated to a larger value.

The defogger 20 may be configured to be turned off when a certain period has elapsed from when the defogger 20 was turned on. According to this configuration, even if the control for turning off the defogger 20 based on the current fails, the defogger 20 is turned off when a certain period has elapsed from when the defogger 20 was turned on. Therefore, even if the control for turning off the defogger 20 based on the current fails, the defogger 20 is not maintained to be turned on for a long period of time. Therefore, it is easy to avoid unnecessary operation of the defogger 20.

When the total power consumption becomes excessively large, the defogger 20 may be turned off regardless of whether the value of the current has converged.

Step S302 and the processing of FIG. 4 may be omitted.

Step S312 may be omitted. That is, the controller 10 may turn off the defogger 20 based on the value of the current having converged to the constant value regardless of the total power consumption.

In the above-described embodiment, the controller 10 includes the control unit 12 and the storage device 14. The controller 10 executes software processing. However, this is merely exemplary. For example, the controller 10 may include a dedicated hardware circuit (for example, an application specific integrated circuit (ASIC) or the like) that processes at least a part of the software processing executed in the above-described embodiment. That is, the controller 10 may be modified as long as it has any one of the following configurations (a) to (c): (a) The controller 10 includes a processing device that executes all processes in accordance with a program and a program storage device such as a ROM that stores the program. That is, the controller 10 includes a software execution device. (b) The controller 10 includes a processing device that executes a part of processing in accordance with a program and a program storage device. Further, the controller 10 includes a dedicated hardware circuit for executing the remaining processing. (c) The controller 10 includes a dedicated hardware circuit that executes all processes. There may be a plurality of software execution devices and/or dedicated hardware circuits. That is, the above processes may be executed by processing circuitry that includes at least one of a software execution devices and a dedicated hardware circuit. The processing of software execution devices and dedicated hardware circuits may be included in the processing circuitry. Program storage devices or computer-readable media may include any available media storage device that can be accessed by a general purpose or special purpose computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a defogger including a heating wire disposed on a window glass of a vehicle, the controller comprising:
   a storage device; and processing circuitry configured to:
  turn on the defogger;
  repeatedly acquire a value of current flowing through the heating wire while the defogger is on;
  repeatedly calculate a total accumulated power consumption while the defogger is on, the total accumulated power consumption being a total of power consumed by the defogger from when the defogger is turned on;
  turn off the defogger when the total accumulated power consumption is greater than or equal to a power threshold value and the value of the current has converged to a constant value;
  acquire a temperature and a humidity outside the vehicle at a point in time when the defogger is turned on;
  determine whether the defogger has been turned on again within a preset period from when the defogger was turned off based on the value of the current having converged to the constant value;
  store, as failure data in the storage device, the temperature, the humidity, and the power threshold value acquired at a time the defogger was turned on when the defogger has been turned on again within the preset period, wherein the preset period is less than one minute; and
  acquire, from a map stored in the storage device, the power threshold value corresponding to the acquired temperature and the acquired humidity.

2. The controller according to claim 1, wherein the processing circuitry is configured to:
  calculate a decrease amount, the decrease amount being an amount by which the acquired value of the current has decreased from the value of the current acquired before a predetermined period;
  calculate a change rate, the change rate being a value obtained by dividing the decrease amount by the value of the current acquired before the predetermined period elapses; and
  determine that the value of the current has converged to the constant value when the change rate is less than a determination threshold value.

3. The controller according to claim 1, wherein the power threshold value in the map is updated to a larger value when the defogger is turned on again within the preset period.

* * * * *